(12) United States Patent
Kawarada et al.

(10) Patent No.: US 8,815,168 B2
(45) Date of Patent: Aug. 26, 2014

(54) CARBON NANOTUBE SYNTHESIZING APPARATUS

(71) Applicants: Honda Motor Co., Ltd., Tokyo (JP); Waseda University, Tokyo (JP)

(72) Inventors: Hiroshi Kawarada, Tokyo (JP); Toshiyuki Ohashi, Saitama (JP); Masahiro Ohta, Saitama (JP); Ryogo Kato, Saitama (JP); Toshio Tokune, Saitama (JP); Hidefumi Nikawa, Saitama (JP)

(73) Assignees: Honda Motor Co., Ltd., Tokyo (JP); Waseda University, Tokyo (JP)

( * ) Notice: Subject to any disclaimer, the term of this patent is extended or adjusted under 35 U.S.C. 154(b) by 0 days.

(21) Appl. No.: 13/791,960

(22) Filed: Mar. 9, 2013

(65) Prior Publication Data

US 2013/0259763 A1   Oct. 3, 2013

(30) Foreign Application Priority Data

Mar. 29, 2012   (JP) .................................. 2012-077548
Mar. 1, 2013    (JP) .................................. 2013-040586

(51) Int. Cl.
*B01J 19/08*   (2006.01)
*C23C 16/511*  (2006.01)

(52) U.S. Cl.
USPC .................. 422/186; 118/723 MW; 977/843

(58) Field of Classification Search
USPC ...... 422/186.04, 186; 118/723 MW; 977/843
See application file for complete search history.

(56) References Cited

U.S. PATENT DOCUMENTS 5,311,103 A * 5/1994 Asmussen et al. ....... 315/111.81

FOREIGN PATENT DOCUMENTS

| JP | 09-301795      | * 11/1997 |
| JP | 2006-036593    | *  2/2006 |
| JP | 2006/0036593 A |    2/2006 |

OTHER PUBLICATIONS

Ren, Z.F., Huang, Z.P., Zu, J.W., Wang, J.H., Bush, P., Siegal, M.P., and Provencio, P.N., "Synthesis of Large Arrays of Well-Aligned Carbon Nanotubes on Glass," Science, Nov. 6, 1998, pp. 1105-1107, vol. 282, AAAS, Washington, DC.

* cited by examiner

*Primary Examiner* — Kishor Mayekar
(74) *Attorney, Agent, or Firm* — Capitol City TechLaw

(57) ABSTRACT

A carbon nanotube synthesizing apparatus in which the state of generated plasma can be stabilized is provided. A carbon nanotube synthesizing apparatus 1 comprises a chamber 2, an antenna 3 including a tip 3*a*, a microwave conductor 4, a gas introducing unit 5, a gas discharging unit 6, a substrate holding unit 7, and a heating unit 8. The shape of the inner wall of the chamber 2 is symmetrical with respect to the tip 3*a* of the antenna 3.

11 Claims, 5 Drawing Sheets

CARBON NANOTUBE SYNTHESIZING APPARATUS

CROSS-REFERENCE TO RELATED ED APPLICATIONS

This application is based upon and claims the benefit of priority from Japanese Patent Applications Nos. 2012-047390 filed on Mar. 2, 2012, and 2013-040586 filed on Mar. 1, 2013, the contents of which are incorporated herein by reference.

BACKGROUND OF THE INVENTION

1. Field of the Invention

The present invention relates to a carbon nanotube synthesizing apparatus.

2. Description of the Related Art

Conventionally, there has been known a method for synthesizing carbon nanotubes oriented in a perpendicular direction on a substrate using a plasma CVD (for example, see Science, 282, 1105, (1998)). The carbon nanotubes oriented in the perpendicular direction on the substrate are used for, for example, multi-walled carbon nanotubes for a field emitter.

According to the method using the plasma CVD, a field improvement effect by a sheath formed by plasma has been considered to contribute to the orientation of carbon nanotubes. However, the method using the plasma CVD has a problem that while carbon radicals are generated in a plasma generation area, the substrate is attacked by ions generated as a by-product of the carbon radicals, so that growing carbon nanotubes are etched. Accordingly, the method using the plasma CVD is disadvantageous in growing long carbon nanotubes, and is more disadvantageous in the case of single-walled carbon nanotubes because single-walled carbon nanotubes are more easily subjected to etching than multi-walled nanotubes.

To solve the above described problem, the inventors has proposed a carbon nanotube synthesizing apparatus configured to, in an antenna-type plasma CVD, hold a substrate in a position at a distance from an antenna which allows the substrate to avoid being attacked by ions that are generated as a by-product of radicals generated by plasma generated at the antenna and allows the substrate to be reached by the radicals kept in a radical state (see Japanese Patent Laid-open No. 2006-36593). According to the above described carbon nanotube synthesizing apparatus, attack by ions originated from plasma can be prevented, and the substrate is not exposed to an unnecessarily high temperature, and therefore it is possible to manufacture oriented carbon nanotubes formed from long single-walled carbon nanotubes.

However, the above described conventional carbon nanotube synthesizing apparatus has a disadvantage that the quality of manufactured oriented carbon nanotubes is not enough.

SUMMARY OF THE INVENTION

Accordingly, to overcome such disadvantage, the present invention is intended to provide a carbon nanotube synthesizing apparatus that can manufacture carbon nanotubes with excellent quality.

After examining the disadvantage of the above described conventional carbon nanotube synthesizing apparatus, the inventors have found that it is necessary to stabilize the state of generated plasma to improve the quality of oriented carbon nanotubes, and made the present invention.

To achieve the above described object, a carbon nanotube synthesizing apparatus according to the present invention comprises: a chamber; an antenna which is provided under a central portion of a ceiling of the chamber and comprises a tip configured to generate plasma; a microwave conductor which is provided in the central portion of the ceiling of the chamber and is configured to conduct a microwave to the antenna, the microwave forming a standing wave by being reflected by the tip of the antenna; a gas introducing unit configured to introduce gas to the chamber; a gas discharging unit configured to discharge gas from the chamber; a substrate holding unit configured to hold a substrate for carbon nanotube synthesis in the chamber; a position adjusting unit configured to adjust a position of the substrate for carbon nanotube synthesis to be a position at a distance from an antenna in the chamber, the distance allowing the substrate for carbon nanotube synthesis to avoid being attacked by an ion that is generated as a by-product of a radical generated by plasma generated at the antenna and to be reached by the radical kept in a radical state; and a heating unit configured to heat the substrate for carbon nanotube synthesis held by the substrate holding unit, wherein a shape of an inner wall of the chamber is symmetrical with respect to the tip of the antenna.

In the carbon nanotube synthesizing apparatus according to the present invention, gas that is a raw material of carbon nanotubes is introduced into the chamber by the gas introducing unit, and the gas in the chamber is discharged by the gas discharging unit, so that the pressure in the chamber is maintained at a predetermined pressure.

Then, under the predetermined pressure, a microwave is conducted from the microwave conductor to the antenna. Since the microwave has been adjusted to be reflected by the tip of the antenna to form a standing wave, the energy can be concentrated on the tip of the antenna to generate plasma.

In the carbon nanotube synthesizing apparatus according to the present invention, the gas that is the raw material of carbon nanotubes is decomposed by the heat of plasma to generate a radical. The radical reaches the substrate for carbon nanotube synthesis held by the substrate holding unit, thereby growing a carbon nanotube on the substrate for carbon nanotube synthesis.

At this time, the position of the substrate for carbon nanotube synthesis with respect to the antenna has been adjusted by the position adjusting unit to the position at a distance which allows the substrate for carbon nanotube synthesis to avoid being attacked by the ion that is generated as a by-product of the radical generated by plasma generated at the antenna and to be reached by the radical kept in the radical state. As a result, carbon nanotubes can be stably synthesized on the substrate for carbon nanotube synthesis.

In addition, because at this time, a temperature required for the carbon nanotube growth is lower than a temperature for decomposition of the gas that is the raw material of carbon nanotubes, the substrate needs to be heated by different means from plasma. To this end, the substrate is heated by the heating unit to a predetermined temperature. As a result, oriented carbon nanotubes formed from long single-walled carbon nanotubes can be grown on the substrate.

If the state of plasma is unstable, the density of carbon radicals generated at the antenna is changed so that the amount of carbon radicals supplied onto the substrate for carbon nanotube synthesis is inappropriate, and carbon nanotubes with excellent quality cannot be manufactured.

Therefore, according to the carbon nanotube synthesizing apparatus of the present invention, a shape of an inner wall of the chamber is symmetrical with respect to the tip of the antenna. As a result, the state of plasma generated at the tip of the antenna can be stabilized, and a suitable amount of carbon radicals can be supplied onto the substrate for carbon nanotube synthesis, and accordingly carbon nanotubes with excellent quality can be manufactured.

In the carbon nanotube synthesizing apparatus of the present invention, it is preferable that a value of R/r, which is a ratio of an inner diameter R of the chamber to an outer diameter r of the antenna, is in a range of 10 to 40, where R is the inner diameter of the chamber and r is the outer diameter of the antenna. As a result, the state of plasma generated at the tip of the antenna can be more stabilized.

If the value of the ratio of R/r is less than 10, it may be impossible to stabilize the state of plasma generated at the tip of the antenna. On the other hand, if the value of the ratio of R/r is greater than 40, since the density of formed carbon radicals required for growth of carbon nanotubes is reduced, it may be difficult to grow the carbon nanotubes uniformly, and to maintain the growth rate of the carbon nanotubes appropriately.

In the carbon nanotube synthesizing apparatus of the present invention, it is preferable that the chamber comprises a dummy unit for each unit, in a position symmetrical to each respective unit provided in the chamber with respect to the tip of the antenna. Thereby, the shape of the inner wall of the chamber can be symmetrical with respect to the tip of the antenna.

Plasma is generated at a projection portion of the antenna or the microwave conductor. Therefore, in the carbon nanotube synthesizing apparatus of the present invention, it is preferable that the microwave conductor is cylindrical, the antenna is conical, and a maximum diameter of the antenna is equal to a diameter of the microwave conductor.

If the maximum diameter of the antenna is equal to the diameter of the microwave conductor when the microwave conductor is cylindrical and the antenna is conical, no projection is formed on a connection portion between the antenna and the microwave conductor. As a result, there are no projection portions other than the tip of the antenna on the antenna or the microwave conductor, and therefore plasma can be efficiently generated at the tip.

Plasma may occur also in an area of high electric field intensity on the outer peripheral surface of the microwave conductor. Therefore, in the carbon nanotube synthesizing apparatus of the present invention, it is preferable that the microwave conductor comprises an insulating member therearound. The carbon nanotube synthesizing apparatus of the present invention may include the insulating member around the microwave conductor so that plasma generation can be prevented on the outer peripheral surface of the microwave conductor, and plasma can be efficiently generated on the tip of the antenna.

Further, in the carbon nanotube synthesizing apparatus of the present invention, it is preferable that the position adjusting unit comprises a first lifting and lowering unit configured to freely lift and lower the substrate holding unit, and the first lifting and lowering unit adjusts the position of the substrate for carbon nanotube synthesis to be the position at the distance, the distance allowing the substrate for carbon nanotube synthesis to avoid being attacked by the ion that is generated as the by-product of the radical generated by plasma generated at the antenna and to be reached by the radical kept in the radical state.

The position adjusting unit may comprise a second lifting and lowering unit configured to freely lift and lower the microwave conductor, and in this case, the second lifting and lowering unit adjusts a position of the antenna to be a position at a distance, the distance allowing the substrate for carbon nanotube synthesis to avoid being attacked by the ion that is generated as the by-product of the radical generated by plasma generated at the antenna and to be reached by the radical kept in the radical state.

This position adjusting unit allows the distance between the antenna and the substrate for carbon nanotube synthesis to be controllable by the first lifting and lowering unit or the second lifting and lowering unit. As a result, the carbon nanotube synthesizing apparatus of the present invention can adjust the position of the substrate for carbon nanotube synthesis to be a position suited for synthesis of carbon nanotubes according to the state of generated plasma.

When the carbon nanotubes grow on the substrate for carbon nanotube synthesis, the direction of the growth is different depending on the catalyst used. In other words, there are cases where carbon nanotubes grow in a direction away from the substrate with respect to the catalyst arranged on the substrate (bottom growth), and a case where carbon nanotubes grow in a direction toward the substrate from the catalyst, and the catalyst is located at the end of the grown carbon nanotubes away from the substrate (top growth).

Therefore, in the carbon nanotube synthesizing apparatus of the present invention, it is preferable that a portion heated by the heating unit can be selected depending on the growth direction of the carbon nanotubes.

For example, it is preferable that the heating unit comprises an induction heating coil provided around the substrate holding unit, and a power supply device configured to supply power to the induction heating coil. In the carbon nanotube synthesizing apparatus of the present invention, the substrate for carbon nanotube synthesis is held by the substrate holding unit, and the induction heating coil is provided around the substrate holding unit. Accordingly, the power supply device can supply power to the induction heating coil so as to heat the substrate for carbon nanotube synthesis rapidly and uniformly, and this is suitable for the case where the carbon nanotube growth is the bottom growth.

Further, it is preferable that the heating unit is configured to be movable in synchronization with and concomitantly with the substrate holding unit. In this configuration, even if the substrate holding unit moves the substrate for carbon nanotube synthesis in a vertical direction, the heating unit can heat the substrate for carbon nanotube synthesis by the induction heating coil without delay.

Further, the heating unit may comprise an infrared heating device provided inside or outside the chamber, and a power supply device configured to supply power to the infrared heating device. If the infrared heating device is provided inside the chamber, the device can heat the substrate for carbon nanotube synthesis, and this is suitable for the case where the carbon nanotube growth is the bottom growth. If the infrared heating device is provided outside the chamber, the device can heat the tips of the carbon nanotubes growing on the substrate for carbon nanotube synthesis, and this is suitable for the case where the carbon nanotube growth is the top growth.

Furthermore, the heating unit may comprise a laser heating device provided outside the chamber, and a power supply device configured to supply power to the laser heating device. If the laser heating device is provided outside the chamber, the device can heat the tips of the carbon nanotubes growing on the substrate for carbon nanotube synthesis, and this is suitable for the case where the carbon nanotube growth is the top growth.

DETAILED DESCRIPTION OF THE PREFERRED EMBODIMENTS

Hereinafter, an embodiment of the present invention will be described in more detail with reference to the drawings.

Figure 1:
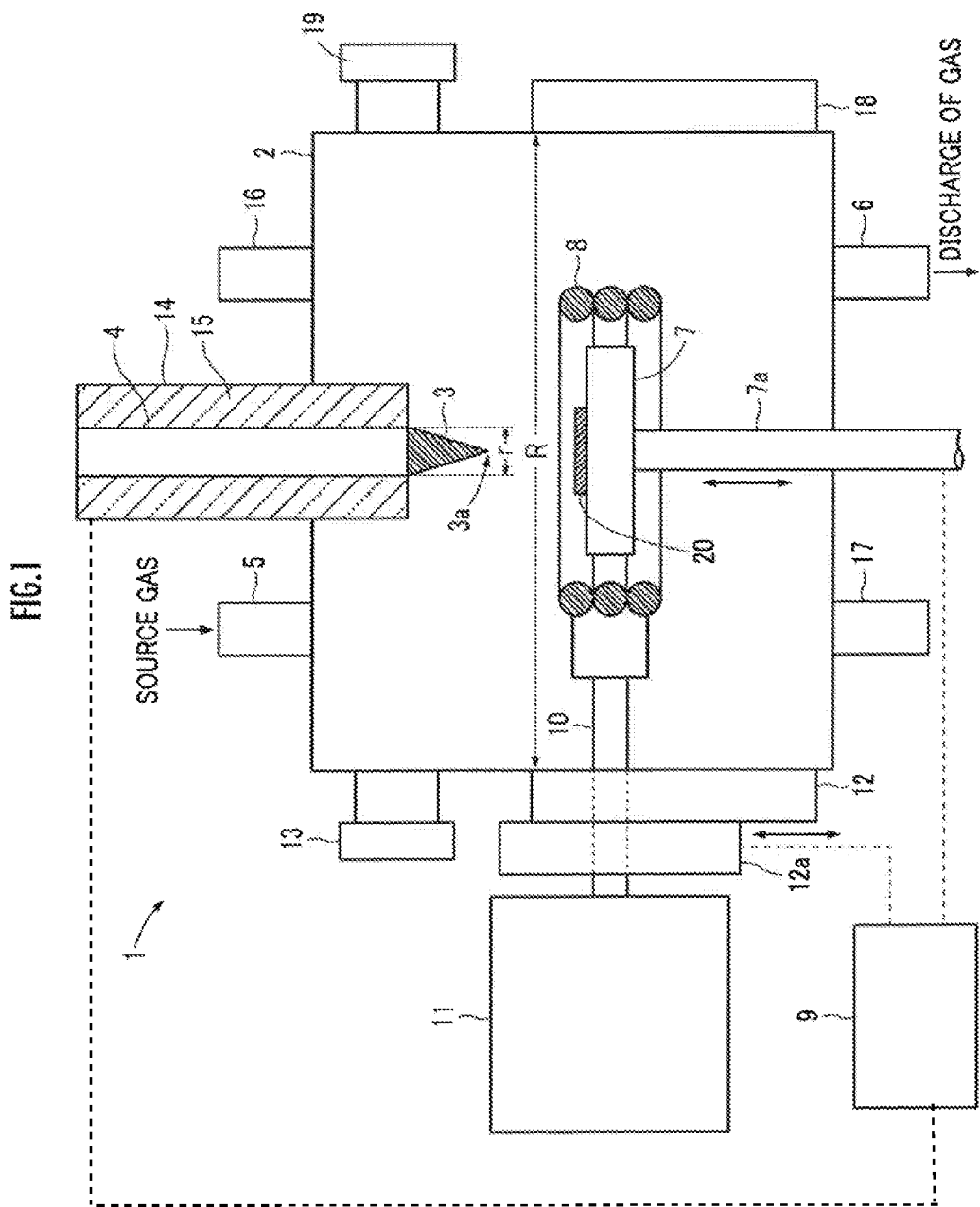
FIG. 1 is an explanatory sectional view illustrating one configuration example of a carbon nanotube synthesizing apparatus of an embodiment.

As shown in FIG. 1, a carbon nanotube synthesizing apparatus 1 of the present embodiment comprises a chamber 2, a conical antenna 3 provided under the central portion of the ceiling of the chamber 2, and a microwave conductor 4 which is provided in the central portion of the ceiling of the chamber 2 and is configured to conduct a microwave to the antenna 3. The microwave conductor 4 is provided at the center of the ceiling of the chamber 2 so as to extend through the top surface of the chamber 2, and the antenna 3 is connected to the tip of the microwave conductor 4 inside the chamber 2.

In the carbon nanotube synthesizing apparatus 1, the value of R/r, the ratio of the inner diameter R of the chamber 2 to the outer diameter r of the antenna 3, is set in the range of 10 to 40, for example, in the range of 12 to 30.

Further, the chamber 2 comprises a gas inlet 5 which introduces gas that is a raw material of carbon nanotubes (hereinafter abbreviated as source gas) in a top surface, and a gas outlet 6 which discharges gas from the chamber 2 in the bottom surface. The gas inlet 5 and the gas outlet 6 are provided at positions symmetrical to each other with respect to the antenna 3 in a planar view.

Further, a substrate holding unit 7 is provided inside the chamber 2 at a position facing to the antenna 3, and an induction heating coil 8 is provided around the substrate holding unit 7. The substrate holding unit 7 is electrically connected to a controller 9 serving as position adjusting unit, and the controller 9 is configured to adjust the position of the substrate holding unit 7 using a rod 7a connected to the substrate holding unit 7 as a lifting and lowering unit. The rod 7a is provided extending through the bottom of the chamber 2.

As a result, the controller 9 can adjust the position of the substrate holding unit 7 with respect to the antenna 3 to a position at a distance which allows the substrate to avoid being attacked by ions that are generated as a by-product of radicals generated by plasma generated at the antenna 3 and allows the substrate to be reached by the radicals kept in a radical state.

The induction heating coil 8 is connected to a power supply device 11 which is provided outside the chamber 2 though a connection portion 10 provided extending through a side of the chamber 2. By a slider 12 which is provided on the side of the chamber 2, the induction heating coil 8 is made movable in a vertical direction together with the connection portion 10 and the power supply device 11. The slider 12 is equipped with a sliding member 12a provided so as to be freely slidable along a guide rail not shown. The sliding member 12a is electrically connected to the controller 9 and controlled by the controller 9 so that the induction heating coil 8 is movable in synchronization with and concomitantly with the substrate holding unit 7 together with the connection portion 10 and the power supply device 11.

Further, the chamber 2 comprises a window 13 on the side of the chamber 2 for observing the inside of the chamber 2.

The antenna 3 comprises a tip 3a at the top of its conical shape. On the other hand, the microwave conductor 4 is cylindrical, and has the same diameter as that of the bottom of the conical antenna 3. As a result, the maximum diameter of the antenna 3 is equal to the diameter of the microwave conductor 4, and the antenna 3 and the microwave conductor 4 are connected to each other without forming any projection portion at the connection portion.

The microwave conductor 4 is connected to a microwave generator (not shown), and the microwave generator is configured to generate a microwave to be reflected by the tip 3 of the antenna 3a to form a standing wave. The microwave conductor 4 is provided inside an outer cylindrical tube 14, and quartz glass 15 fills, as an insulating member, between the outer peripheral surface of the microwave conductor 4 and the inner peripheral surface of the outer cylindrical tube 14. The end portion of the quartz glass 15 on the opposite side to the chamber 2 is vacuum-sealed (not shown).

During carbon nanotube synthesis as described later, there is a pressure difference between upper and lower sides of the vacuum seal. It is desirable that the vacuum sealing is metal brazing from the view point of strength to withstand this pressure difference. However, for the purpose of preventing reflection of microwaves, it is desirable that the vacuum seal is applied to only a part of the outer peripheral surface of the microwave conductor 4 and the inner peripheral surface of the outer cylindrical tube 14, and ceramics such as alumina through which microwaves can pass is used for the other part.

As described above, in the carbon nanotube synthesizing apparatus 1, a pressure difference occurs between the inside of the chamber 2 and the upside of the vacuum seal during carbon nanotube manufacturing as described later. However, since the vacuum seal provides mechanical strength to resist this pressure difference, the quartz glass 15 that fills between the outer peripheral surface of the microwave conductor 4 and the inner peripheral surface of the outer cylindrical tube 14 can be prevented from being damaged by the pressure difference.

In addition, there is a concern that when plasma is generated at the antenna 3, the temperature of the quartz glass 15 rises as the temperature of the antenna 3 rises. However, since the quartz glass 15 fills between the outer peripheral surface of the microwave conductor 4 and the inner peripheral surface of the outer cylindrical tube 14, such a temperature rise can be prevented. As a result, a heat resistance is not required for the vacuum seal, and any material through which microwaves can pass can be used.

The gas inlet 5 is connected to a gas supply source (not shown), and gas supplied from the gas supply source is supplied through the gas inlet 5 into the chamber 2 as source gas of carbon nanotubes. As the source gas, a mixed gas of methane and hydrogen may be used, for example.

The gas outlet 6 is connected to a vacuum pump (not shown), and gas in chamber 2 is discharged through the gas outlet 6 by the vacuum pump so that the inside of the chamber 2 is kept at a predetermined reduced pressure state.

Further, the chamber 2 comprises a dummy gas inlet 16, a dummy gas outlet 17, a dummy slider 18, and a dummy window 19 at positions symmetrical to the gas inlet 5, the gas outlet 6, the slider 12, and the window 13 with respect to the tip 3a of the antenna 3, respectively. The dummy gas inlet 16, the dummy gas outlet 17, the dummy slider 18, and the dummy window 19 have the same shapes on the inner wall surface of the chamber 2 as those of the gas inlet 5, the gas outlet 6, the slider 12, and the window 13, respectively. As a result, the shape of the inner wall of the chamber 2 is symmetrical with respect to the tip 3a of the antenna 3.

A method of manufacturing a carbon nanotube by the carbon nanotube synthesizing apparatus 1 of the present embodiment will be described below.

In the carbon nanotube synthesizing apparatus 1, a substrate for carbon nanotube synthesis (hereinafter abbreviated as a CNT synthesizing substrate) 20 is first placed on the substrate holding unit 7, and arranged at a predetermined position facing to the antenna 3 by the substrate holding unit 7. As the CNT synthesizing substrate 20, a substrate including, on a base material, a reaction prevention layer, a catalyst material layer, a dispersion layer, and a dispersion promotion layer in this order may be used, for example.

Then, source gas is supplied from the gas inlet 5 into the chamber 2 while the gas in the chamber 2 is discharged from the gas outlet, so that the inside of the chamber 2 is kept at a predetermined reduced pressure state. Then, the power supply device 11 supplies power to the induction heating coil 8 though the connection portion 10, thereby heating the CNT synthesizing substrate arranged on the inner periphery side of the induction heating coil 8.

Then, a microwave generated by the microwave generator is conducted to the antenna 3 through the microwave conductor 4, and reflected by the tip 3a of the antenna 3 to form a standing wave. At this time, the quartz glass 15 as an insulating member has been provided around the microwave conductor 4.

Further, since the diameter of the conical bottom of the antenna 3 is identical to the diameter of the cylindrical microwave conductor 4, the antenna 3 and the microwave conductor 4 have been connected to each other without forming any projection portion. As a result, a plasma generating part can be concentrated on the tip 3a of the antenna 3, and plasma can be efficiently generated.

The chamber 2 comprises the dummy gas inlet 16, the dummy gas outlet 17, the dummy slider 18, and the dummy window 19 at positions symmetrical to the gas inlet 5, the gas outlet 6, the slider 12, and the window 13 with respect to the tip 3a of the antenna 3, respectively. As a result, the shape of the inner wall of the chamber 2 is symmetrical with respect to the tip 3a of the antenna 3, and therefore the state of plasma generated at the tip 3a can be stabilized.

Further, since the value of R/r, the ratio of the inner diameter R of the chamber 2 to the outer diameter r of the antenna 3, is in the range of 10 to 40, the state of plasma generated at the tip 3a of the antenna 3 can be more stabilized.

The position of the substrate holding unit 7 is adjusted by the controller 9 to be a position at a distance which allows the substrate to avoid being attacked by ions that are generated as a by-product of radicals generated by plasma generated at the antenna 3 and allows the substrate to be reached by the radicals kept in a radical state. The CNT synthesizing substrate 20 is placed on the substrate holding unit 7 whose position has been adjusted as described above, and rapidly and uniformly heated by the induction heating coil 8. Since the induction heating coil 8 is made movable in synchronization with and concomitantly with the substrate holding unit 7 by the controller 9, the heated state of the CNT synthesizing substrate 20 can be maintained even if the position of the CNT synthesizing substrate 20 is adjusted by the substrate holding unit 7.

Thus, according to the carbon nanotube synthesizing apparatus 1, the state of plasma generated at the tip 3a of the antenna 3 can be stabilized, and furthermore, the CNT synthesizing substrate 20 can be heated to a state optimized for carbon nanotubes to grow in the bottom growth. As a result, according to the carbon nanotube synthesizing apparatus 1, carbon nanotubes with excellent quality can be synthesized.

A Raman spectrum of carbon nanotubes manufactured by the carbon nanotube synthesizing apparatus 1 was measured using a 633 nm laser wave. The result is shown in FIG. 2.

Figure 2:
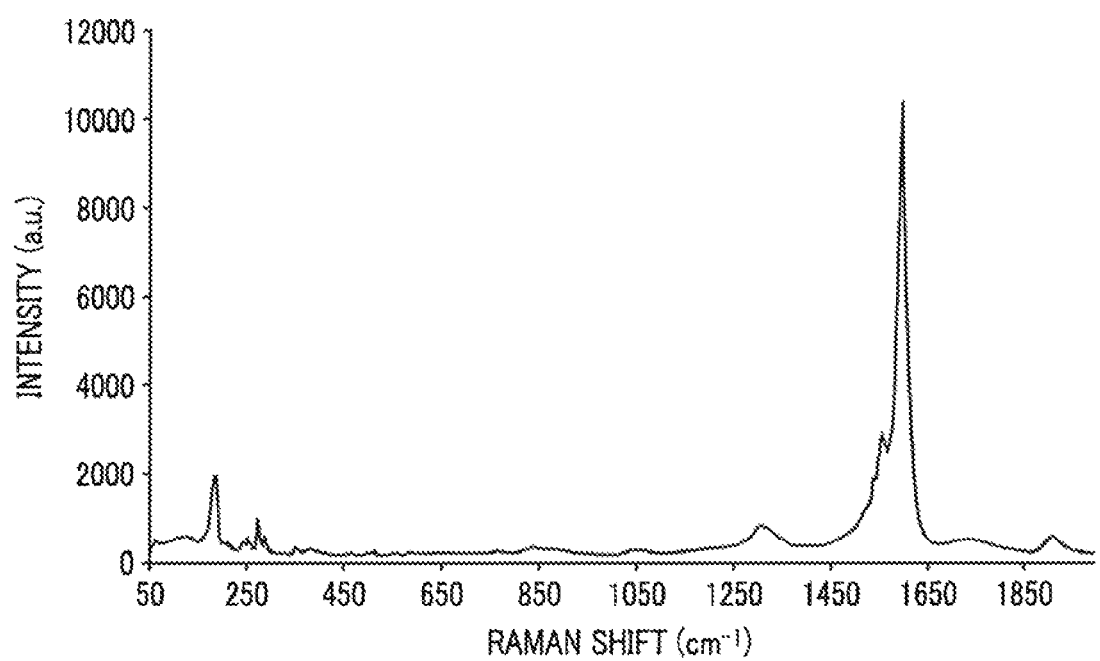
FIG. 2 is a chart illustrating a Raman spectrum of carbon nanotubes synthesized using the carbon nanotube synthesizing apparatus of the present embodiment.

It is apparent from FIG. 2 that the carbon nanotubes manufactured by the carbon nanotube synthesizing apparatus 1 has excellent quality with a high G/D ratio and few defects.

Figure 3:
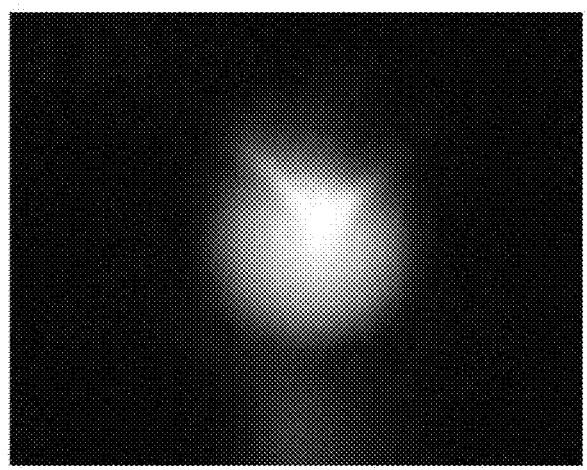
FIG. 3 is a photograph of plasma generated at a tip 3a of an antenna 3 in the carbon nanotube synthesizing apparatus of the present embodiment when the value of R/r, which is the ratio of the inner diameter R of a chamber to the outer diameter r of the antenna, is 15.
Figure 4:
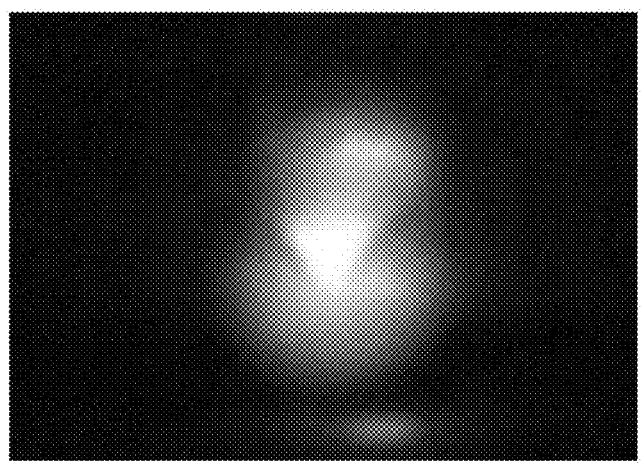
FIG. 4 is a photograph of plasma generated at the tip 3a of the antenna 3 in the carbon nanotube synthesizing apparatus of the present embodiment when the value of R/r, the ratio of the inner diameter R of the chamber to the outer diameter r of the antenna, is 7.

FIG. 3 shows a photograph of plasmas generated at the tip 3a of the antenna 3 in the carbon nanotube synthesizing apparatus 1 when the value of R/r, which is the ratio of the inner diameter R of the chamber 2 to the outer diameter r of the antenna, is 15. FIG. 4 shows a photographing of plasmas generated at the tip 3a of the antenna 3 when the value of R/r, which is the ratio of the inner diameter R of the chamber 2 to the outer diameter r of the antenna, is 7.

It is apparent from FIG. 3 that when the value of R/r, which is the ratio of the inner diameter R of the chamber 2 to the outer diameter r of the antenna, is 15 within the range of 10 to 40, spherical plasma is generated at the tip 3a of the antenna 3. In contrast, when the value of the ratio of R/r is 7 outside the range of 10 to 40, plasma is also generated in other areas than the tip 3a of the antenna 3, and plasma generation is unstable.

In the carbon nanotube synthesizing apparatus 1 of the present embodiment, the dummy gas inlet 16 and the dummy gas outlet 17 may have gas introducing and discharging functions instead of being dummies, respectively. In this case, since the inlet 16 and the outlet 17 serve together with the gas inlet 5 and the gas outlet 6, there are two mechanisms for introducing and discharging gas, and therefore gas flow in the chamber 2 can be made more symmetrical. As a result of this symmetry in addition to the symmetry of the shape of the inner wall of the chamber 2, the state of plasma generated at the tip 3a of the antenna 3 can be more stabilized.

Figure 5:
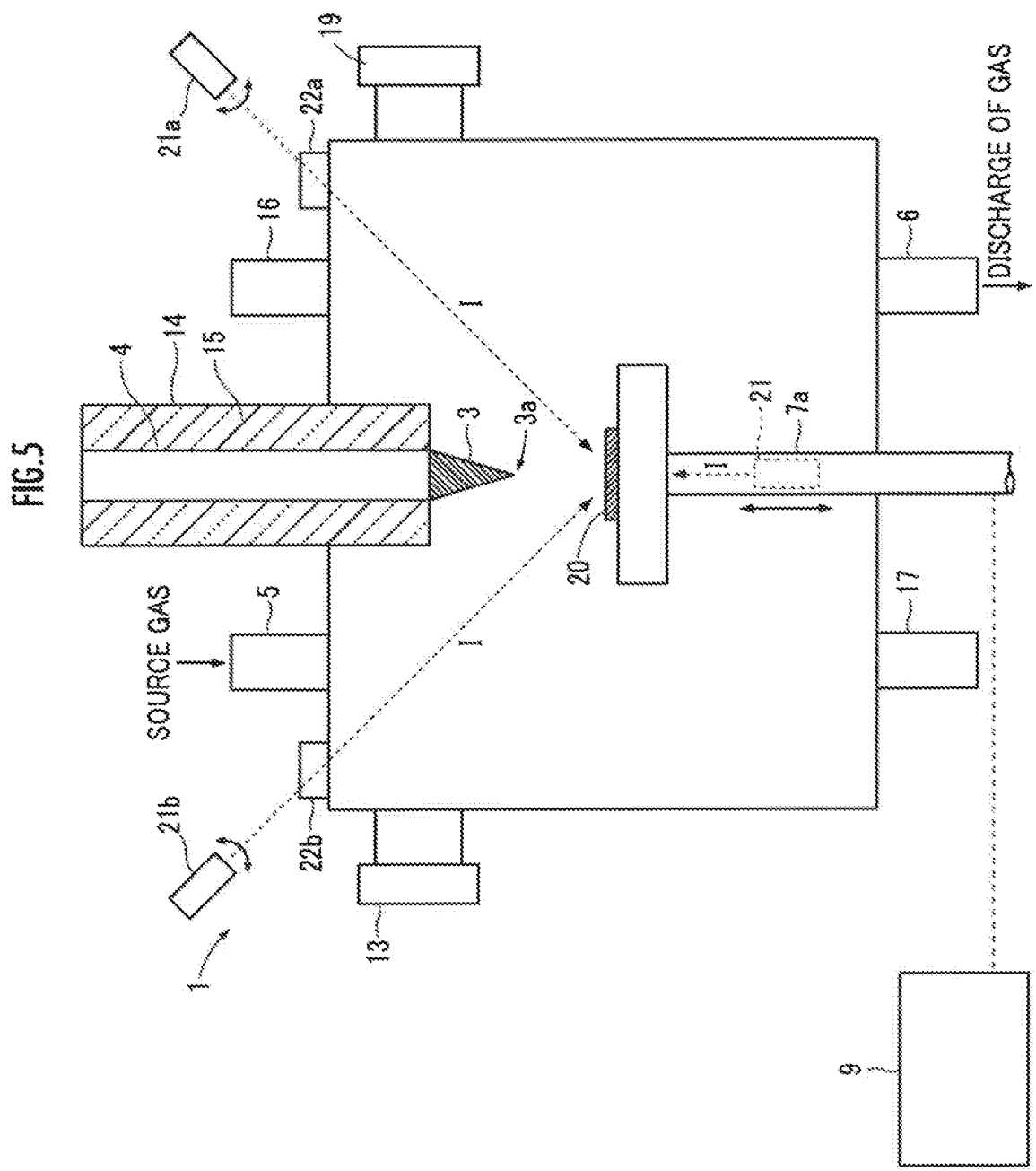
FIG. 5 is an explanatory sectional view illustrating another configuration example of the carbon nanotube synthesizing apparatus of the present embodiment.

Although the substrate holding unit 7 is heated by the induction heating coil 8 in the carbon nanotube synthesizing apparatus 1 of the present embodiment, the substrate holding unit 7 may be heated by an infrared heating device 21 shown in FIG. 5 instead of the induction heating coil 8.

In the case where the infrared heating device 21 is provided inside the chamber 2, it can be provided inside the rod 7a by which the substrate holding unit 7 is made movable in a vertical direction. Then, an infrared ray I generated by supplying power from a power supply device (not show) to a built-in infrared lamp (not shown) is directed to the CNT synthesizing substrate 20.

As a result, the infrared heating device 21 can heat the CNT synthesizing substrate 20 to a state optimized for carbon nanotubes to grow in the bottom growth. In addition, since the infrared heating device 21 is provided inside the rod 7a, the symmetry of the shape of the inner wall of the chamber 2 is not lost.

In the case where the infrared heating device 21 is provided outside the chamber 2, it can be provided as infrared heating devices 21a, 21b at positions symmetrical with respect to the tip 3a of the antenna 3. By the infrared heating devices 21a, 21b, infrared rays I generated by supplying power from a power supply device (not show) to built-in infrared lamps (not shown) are directed to the CNT synthesizing substrate 20 through windows 22a, 22b provided on the top surface of the chamber 2, respectively. Because the infrared heating devices 21a, 21b are configured to be swingable with respect to the windows 22a, 22b, the infrared heating devices 21a, 21b can change the optical axes of the infrared rays I according to the position of the CNT synthesizing substrate 20, and surely direct the infrared rays I to the CNT synthesizing substrate 20, respectively.

As a result, the infrared heating devices 21a, 21b can heat the tips of carbon nanotubes that grow on the CNT synthesizing substrate 20 to a state optimized for the carbon nanotubes to grow in the top growth. It is noted that the windows 22a, 22b are formed in the same shape at positions symmetrical with respect to the tip 3a of the antenna 3.

Figure 6:
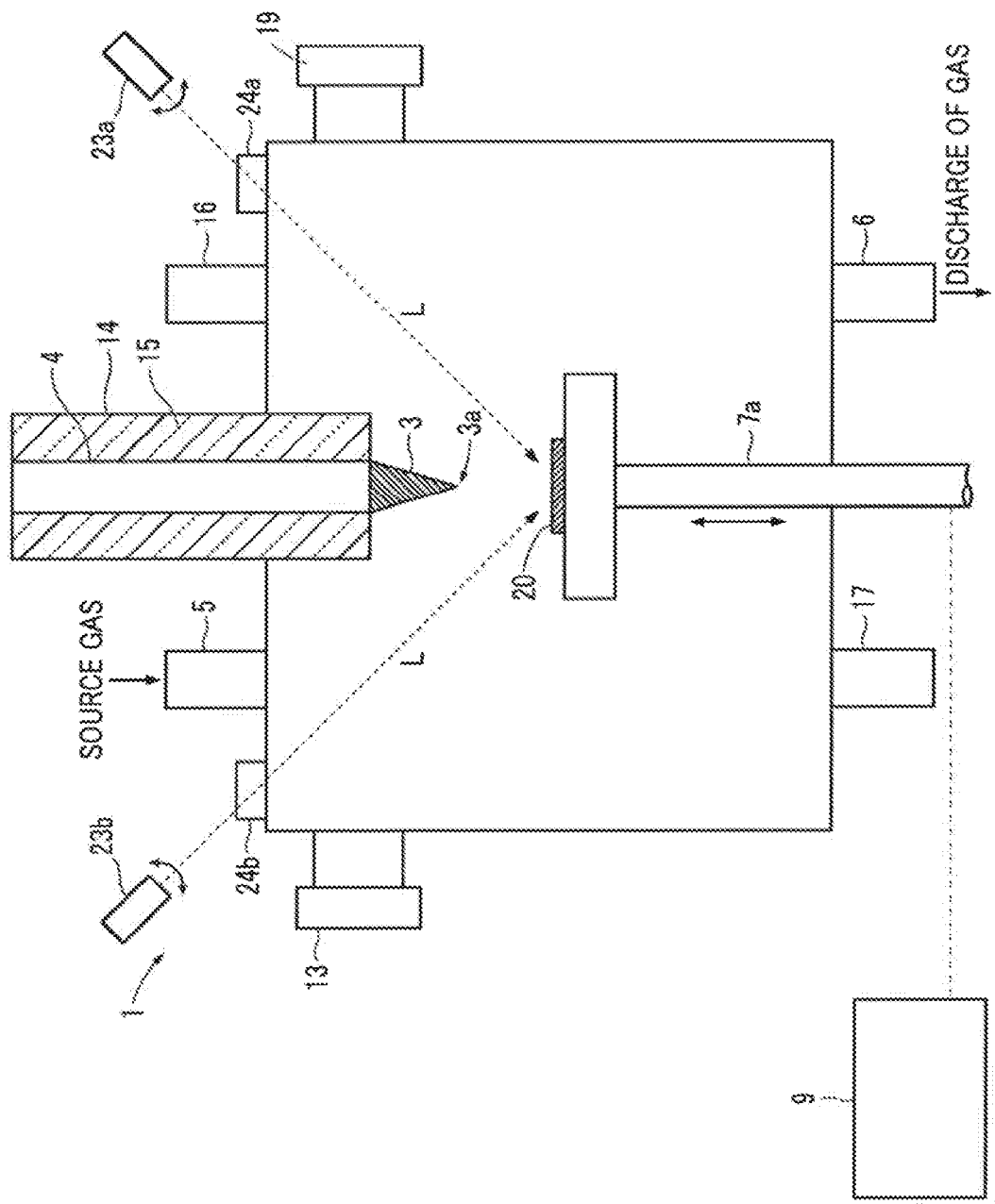
FIG. 6 is an explanatory sectional view illustrating still another configuration example of the carbon nanotube synthesizing apparatus of the present embodiment.

In the carbon nanotube synthesizing apparatus 1 of the present embodiment, the substrate holding unit 7 may be heated by the laser heating devices 23a, 23b shown in FIG. 6. The laser heating devices 23a, 23b may be provided, for example, at positions symmetrical with respect to the tip 3a of the antenna 3 outside the chamber 2. By the laser heating devices 23a, 23b, laser beams L generated by supplying power from a power supply device (not show) are directed to the CNT synthesizing substrate 20 through windows 24a, 24b provided on the top surface of the chamber 2, respectively. Because the laser heating devices 23a, 23b are configured to be swingable with respect to the windows 24a, 24b, the laser heating devices 23a, 23b can change the optical axes of the laser beams L according to the position of the CNT synthesizing substrate 20, and surely direct the laser beams L to the CNT synthesizing substrate 20, respectively.

As a result, the laser heating devices 23a, 23b can heat the tips of carbon nanotubes that grow on the CNT synthesizing substrate 20 to a state optimized for the carbon nanotubes to grow in the top growth. It is noted that the windows 24a, 24b are formed in the same shape at positions symmetrical with respect to the tip 3a of the antenna 3.

Further, in the carbon nanotube synthesizing apparatus 1 of the present invention, an adhesion preventing plate made of metal may be provided on the inner wall of the chamber 2. The adhesion preventing plate can prevent a product originated from source gas decomposed by plasma in the vicinity of the antenna 3 from adhering to the inner wall of the chamber 2, and further can facilitate the effect of making the shape of an inner wall of the chamber 2 symmetrical with respect to the tip 3a of the antenna 3.

Although in the present embodiment, the substrate holding unit 7 is lifted/lowered by the controller 9 through the rod 7a so that the position of the substrate holding unit 7 with respect to the antenna 3 is adjusted to a position at a distance which allows the substrate to avoid being attacked by ions that are generated as a by-product of radicals generated by plasma generated at the antenna 3 and allows the substrate to be reached by the radicals kept in a radical state, the microwave conductor 4 may be lifted/lowered. In this case, a lifting and lowering unit is provided to the microwave conductor 4, and the lifting and lowering unit is electrically connected to the controller 9. Then, the microwave conductor 4 is lifted/lowered by the controller 9 though the lifting and lowering unit.

Also in the case where the microwave conductor 4 is configured to be freely lifted and lowered as described above, the position of the substrate holding unit 7 with respect to the antenna 3 can be adjusted to a position at a distance which allows the substrate to avoid being attacked by ions that are generated as a by-product of radicals generated by plasma generated at the antenna 3 and allows the substrate to be reached by the radicals kept in a radical state.

What is claimed is:

1. A carbon nanotube synthesizing apparatus comprising:
   a chamber;
   an antenna which is provided under a central portion of a ceiling of the chamber and comprises a tip configured to generate plasma;
   a microwave conductor which is provided in the central portion of the ceiling of the chamber and is configured to conduct a microwave to the antenna, the microwave forming a standing wave by being reflected by the tip of the antenna;
   a gas inlet configured to introduce gas to the chamber;
   a gas outlet configured to discharge gas from the chamber;
   a substrate holding unit configured to hold a substrate for carbon nanotube synthesis in the chamber;
   a position adjusting unit configured to adjust a position of the substrate for carbon nanotube synthesis to a position at a distance from an antenna in the chamber, the distance allowing the substrate for carbon nanotube synthesis to avoid being attacked by an ion that is generated as a by-product of a radical generated by plasma generated at the antenna and to be reached by the radical kept in a radical state; and
   a heating unit configured to heat the substrate for carbon nanotube synthesis held by the substrate holding unit,
   wherein a shape of an inner wall of the chamber is symmetrical with respect to the tip of the antenna, and
   wherein the microwave conductor extends from a first surface of the chamber, the gas inlet is disposed in the ceiling of the chamber, the gas outlet is disposed in a surface opposite the ceiling of the chamber, and the gas inlet and the gas outlet are positioned symmetrical to each other in the chamber with respect to the tip of the antenna.

2. The carbon nanotube synthesizing apparatus according to claim 1, wherein a value of R/r, which is a ratio of an inner diameter R of the chamber to an outer diameter r of the antenna, is in a range of 10 to 40, where R is the inner diameter of the chamber and r is the outer diameter of the antenna.

3. The carbon nanotube synthesizing apparatus according to claim 1, wherein the microwave conductor is cylindrical, the antenna is conical, and a maximum diameter of the antenna is equal to a diameter of the microwave conductor.

4. The carbon nanotube synthesizing apparatus according to claim 1, wherein the microwave conductor comprises an insulating member therearound.

5. The carbon nanotube synthesizing apparatus according to claim 1, wherein the position adjusting unit comprises a first lifting and lowering unit configured to freely lift and lower the substrate holding unit, and the first lifting and lowering unit adjusts the position of the substrate for carbon nanotube synthesis to be the position at the distance, the distance allowing the substrate for carbon nanotube synthesis to avoid being attacked by the ion that is generated as the by-product of the radical generated by plasma generated at the antenna and to be reached by the radical kept in the radical state.

6. The carbon nanotube synthesizing apparatus according to claim 1, wherein the position adjusting unit comprises a second lifting and lowering unit configured to freely lift and lower the microwave conductor, and the second lifting and lowering unit adjusts a position of the antenna to be a position at a distance, the distance allowing the substrate for carbon nanotube synthesis to avoid being attacked by the ion that is generated as the by-product of the radical generated by plasma generated at the antenna and to be reached by the radical kept in the radical state.

7. The carbon nanotube synthesizing apparatus according to claim 1, wherein the heating unit comprises an induction heating coil provided around the substrate holding unit, and a power supply device configured to supply power to the induction heating coil.

8. The carbon nanotube synthesizing apparatus according to claim 7, wherein the heating unit is further configured to be movable in synchronization with and concomitantly with the substrate holding unit.

9. The carbon nanotube synthesizing apparatus according to claim 1, wherein the heating unit comprises an infrared heating device provided inside or outside the chamber, and a power supply device configured to supply power to the infrared heating device.

10. The carbon nanotube synthesizing apparatus according to claim 1, wherein the heating unit comprises a laser heating device provided outside the chamber, and a power supply device configured to supply power to the laser heating device.

11. The carbon nanotube synthesizing apparatus according to claim 1, wherein a portion of the microwave conductor extends into the chamber, and the portion is covered by an electrical insulator.

* * * * *